United States Patent
Hodono

(10) Patent No.: US 8,428,403 B2
(45) Date of Patent: Apr. 23, 2013

(54) OPTICAL SENSOR MODULE

(75) Inventor: Masayuki Hodono, Ibaraki (JP)

(73) Assignee: Nitto Denko Corporation, Ibaraki-shi, Osaka (JP)

(*) Notice: Subject to any disclaimer, the term of this patent is extended or adjusted under 35 U.S.C. 154(b) by 4 days.

(21) Appl. No.: 13/184,865

(22) Filed: Jul. 18, 2011

(65) Prior Publication Data

US 2012/0027338 A1 Feb. 2, 2012

(30) Foreign Application Priority Data

Jul. 27, 2010 (JP) ................ 2010-168316

(51) Int. Cl.
G02B 6/12 (2006.01)
G02B 6/42 (2006.01)
G02B 6/10 (2006.01)

(52) U.S. Cl.
USPC ............. 385/14; 385/52; 385/129; 385/131

(58) Field of Classification Search .......... None
See application file for complete search history.

(56) References Cited

U.S. PATENT DOCUMENTS

| | | |
|---|---|---|
| 5,222,175 A | 6/1993 | Tatoh |
| 5,265,184 A | 11/1993 | Lebby et al. |
| 5,319,725 A | 6/1994 | Buchmann et al. |
| 5,359,686 A | 10/1994 | Galloway et al. |
| 5,428,704 A | 6/1995 | Lebby et al. |
| 5,446,814 A | 8/1995 | Kuo et al. |
| 5,521,992 A | 5/1996 | Chun et al. |
| 5,780,875 A | 7/1998 | Tsuji et al. |
| 5,835,646 A * | 11/1998 | Yoshimura et al. ............ 385/14 |
| 5,905,831 A | 5/1999 | Boudreau et al. |
| 5,909,523 A * | 6/1999 | Sakaino et al. ............ 385/49 |
| 6,042,276 A * | 3/2000 | Tachigori ............ 385/88 |
| 6,088,498 A | 7/2000 | Hibbs-Brenner et al. |
| 6,456,766 B1 * | 9/2002 | Shaw et al. ............ 385/47 |

(Continued)

FOREIGN PATENT DOCUMENTS

| | | |
|---|---|---|
| CN | 101002123 A | 7/2007 |
| CN | 101014889 A | 8/2007 |

(Continued)

OTHER PUBLICATIONS

European Search Report dated Jul. 13, 2010, issued in related European Patent Application No. 10159096.

(Continued)

Primary Examiner — Michelle R Connelly
(74) Attorney, Agent, or Firm — Westerman, Hattori, Daniels & Adrian, LLP

(57) ABSTRACT

An optical sensor module is provided which reduces variations in optical coupling loss between a core in an optical waveguide unit and an optical element in a substrate unit and which reduces the optical coupling loss. The optical waveguide unit including vertical groove portions for fitting engagement with the substrate unit and the substrate unit including fitting plate portions for fitting engagement with the vertical groove portions are produced individually. The fitting plate portions in the substrate unit are brought into fitting engagement with the vertical groove portions in the optical waveguide unit, so that the substrate unit and the optical waveguide unit are integrated together. The vertical groove portions in the optical waveguide unit are in an appropriate position relative to a light-transmissive surface of the core. The fitting plate portions in the substrate unit are in an appropriate position relative to the optical element.

9 Claims, 11 Drawing Sheets

U.S. PATENT DOCUMENTS

| | | | |
|---|---|---|---|
| 6,541,762 B2 | 4/2003 | Kang et al. | |
| 6,912,333 B2 | 6/2005 | Mikawa et al. | |
| 6,917,056 B2 * | 7/2005 | Dautartas et al. | 257/98 |
| 7,063,467 B2 | 6/2006 | Nagasaka et al. | |
| 7,146,080 B2 * | 12/2006 | Neta et al. | 385/40 |
| 7,150,569 B2 | 12/2006 | Oono et al. | |
| 7,184,630 B2 | 2/2007 | Kwon et al. | |
| 7,310,457 B2 * | 12/2007 | Kotake | 385/14 |
| 7,313,293 B2 | 12/2007 | Murashima et al. | |
| 7,317,861 B2 | 1/2008 | Ohtsu et al. | |
| 7,333,682 B2 | 2/2008 | Kobayashi et al. | |
| 7,373,033 B2 | 5/2008 | Lu et al. | |
| 7,668,414 B2 | 2/2010 | Shemi et al. | |
| 7,724,988 B2 * | 5/2010 | Dellmann et al. | 385/14 |
| 7,898,736 B2 | 3/2011 | Jacobowitz et al. | |
| 8,014,638 B2 * | 9/2011 | Nakano et al. | 385/14 |
| 2002/0076161 A1 | 6/2002 | Hirabayashi et al. | |
| 2003/0219208 A1 | 11/2003 | Kwon et al. | |
| 2004/0001661 A1 * | 1/2004 | Iwaki et al. | 385/14 |
| 2004/0190831 A1 * | 9/2004 | Lu et al. | 385/49 |
| 2004/0234210 A1 | 11/2004 | Nagasaka et al. | |
| 2005/0100264 A1 | 5/2005 | Kim et al. | |
| 2005/0185892 A1 | 8/2005 | Kwon et al. | |
| 2005/0201667 A1 | 9/2005 | Neta et al. | |
| 2005/0207718 A1 | 9/2005 | Komura et al. | |
| 2006/0045410 A1 | 3/2006 | Trott et al. | |
| 2006/0093259 A1 * | 5/2006 | Oggioni et al. | 385/31 |
| 2007/0127865 A1 | 6/2007 | Lu et al. | |
| 2007/0297713 A1 | 12/2007 | Lu et al. | |
| 2008/0037927 A1 | 2/2008 | Kurihara et al. | |
| 2009/0016670 A1 | 1/2009 | Shemi et al. | |
| 2009/0116799 A1 | 5/2009 | Hodono | |
| 2009/0279827 A1 | 11/2009 | Sano et al. | |
| 2009/0285580 A1 | 11/2009 | Yasuda et al. | |
| 2010/0254666 A1 | 10/2010 | Hodono | |
| 2011/0026873 A1 * | 2/2011 | Hodono | 385/12 |
| 2011/0085758 A1 * | 4/2011 | Hodono | 385/12 |
| 2011/0135250 A1 | 6/2011 | Hodono | |
| 2011/0216995 A1 * | 9/2011 | Hodono | 385/12 |
| 2012/0027338 A1 | 2/2012 | Hodono | |
| 2012/0051684 A1 * | 3/2012 | Hodono | 385/12 |
| 2012/0051687 A1 | 3/2012 | Evans | |
| 2012/0201490 A1 * | 8/2012 | Naito et al. | 385/12 |

FOREIGN PATENT DOCUMENTS

| | | |
|---|---|---|
| CN | 101430401 A | 5/2009 |
| CN | 101859006 A | 10/2010 |
| EP | 0548440 A1 | 6/1993 |
| JP | 5-196831 A | 8/1993 |
| JP | 5196831 A | 8/1993 |
| JP | 2004-302345 A | 10/2004 |
| JP | 2008-102283 A | 5/2008 |
| JP | 2009-180723 A | 8/2009 |
| JP | 2011-033876 A | 2/2011 |
| JP | 2011033876 A | 2/2011 |
| JP | 2011-102955 A | 5/2011 |
| WO | 2004015463 A1 | 2/2004 |
| WO | 2009/001969 A2 | 12/2008 |

OTHER PUBLICATIONS

Japanese patent application of 2009-180723, filed Aug. 3, 2009.
Chinese Office Action dated Aug. 22, 2012, issued in related Chinese Patent Application No. 201010244781.0 (5 pages).
U.S. Office Action dated Sep. 26, 2012, issued in related U.S. Appl. No. 12/847,121.
U.S. Office Action dated Apr. 27, 2011, issued in related U.S. Appl. No. 13/020,936.
U.S. Notice of Allowance dated Aug. 25, 2011, issued in related U.S. Appl. No. 13/020,936.
U.S. Notice of Allowance dated Oct. 25, 2012, issued in related U.S. Appl. No. 12/900,964.
U.S. Notice of Allowance dated Oct. 2, 2012, issued in related U.S. Appl. No. 13/211,096.
U.S. Office Action dated Sep. 26, 2012, issued in related U.S. Appl. No. 13/361,230.
U.S. Notice of Allowance dated Jan. 4, 2013, issued in corresponding U.S. Appl. No. 13/040,849.

* cited by examiner

OPTICAL SENSOR MODULE

BACKGROUND OF THE INVENTION

1. Field of the Invention

The present invention relates to an optical sensor module including an optical waveguide unit, and a substrate unit with an optical element mounted therein.

2. Description of the Related Art

As shown in FIGS. 9A and 9B, an optical sensor module is manufactured by: individually producing an optical waveguide unit $W_0$ in which an under cladding layer 71, a core 72 and an over cladding layer 73 are disposed in the order named, and a substrate unit $E_0$ in which an optical element 82 is mounted on a substrate 81; and then connecting the substrate unit $E_0$ to an end portion of the optical waveguide unit $W_0$ with an adhesive and the like, with the core 72 of the optical waveguide unit $W_0$ and the optical element 82 of the substrate unit $E_0$ kept in alignment with each other. In FIGS. 9A and 9B, the reference numeral 75 designates a base, and 85 designates a sealing resin.

The alignment between the core 72 of the optical waveguide unit $W_0$ and the optical element 82 of the substrate unit $E_0$ is generally performed by using a self-aligning machine, as disclosed in, for example, Japanese Published Patent Application No. 5-196831 (1993). In this self-aligning machine, the alignment is performed, with the optical waveguide unit $W_0$ fixed on a fixed stage (not shown) and the substrate unit $E_0$ fixed on a movable stage (not shown). Specifically, when the optical element 82 is a light-emitting element, the alignment is performed in a manner to be described below. As shown in FIG. 9A, light $H_1$ is emitted from the light-emitting element. In this state, while the position of the substrate unit $E_0$ is changed relative to a first end surface (light entrance) 72a of the core 72, the amount of light emitted outwardly from a second end surface (light exit) 72b of the core 72 through a lens portion 73b provided in a front end portion of the over cladding layer 73 (the voltage developed across a light-receiving element 91 provided in the self-aligning machine) is monitored. Then, the position in which the amount of light reaches a maximum value is determined as an alignment position (a position in which the core 72 and the optical element 82 are appropriate relative to each other). On the other hand, when the optical element 82 is a light-receiving element, the alignment is performed in a manner to be described below. As shown in FIG. 9B, the second end surface 72b of the core 72 receives a constant amount of light $H_2$ (light emitted from a light-emitting element 92 provided in the self-aligning machine and transmitted through the lens portion 73b provided in the front end portion of the over cladding layer 73). The light $H_2$ is emitted outwardly from the first end surface 72a of the core 72 through a rear end portion 73a of the over cladding layer 73. In this state, while the position of the substrate unit $E_0$ is changed relative to the first end surface 72a of the core 72, the amount of light received by the light-receiving element (the voltage) is monitored. Then, the position in which the amount of light reaches a maximum value is determined as the alignment position.

However, the alignment using the above-mentioned self-aligning machine can be high-precision alignment, but requires labor and time and is therefore unsuited for mass production.

An optical sensor module capable of achieving alignment without such equipment and labor as mentioned above is disclosed in Japanese Patent Application No. 2009-180723. FIG. 10A is a plan view of this optical sensor module, and FIG. 10B is a perspective view of a right-hand end portion of the optical sensor module as seen diagonally from the upper right. With reference to FIGS. 10A and 10B, this optical sensor module includes an optical waveguide unit $W_1$ having extensions 44 configured such that opposite end portions of an under cladding layer 41 and an over cladding layer 43 where a core 42 is absent (upper and lower portions thereof at its right-hand end as seen in FIG. 10A) are extended in an axial direction. The extensions 44 include a pair of vertical groove portions (fitting portions) 44a extending across the thickness of the optical waveguide unit $W_1$ and for fitting engagement with a substrate unit. The extensions 44 are provided in an appropriate position relative to a light-transmissive surface (a first end surface) 42a of the core 42. The optical sensor module further includes a substrate unit $E_1$ having fitting plate portions (to-be-fitted portions) 51a for fitting engagement with the respective vertical groove portions 44a. The fitting plate portions 51a are provided in an appropriate position relative to an optical element 54, and protrude along the width of the substrate unit $E_1$ (leftwardly and rightwardly as seen in FIG. 10B).

In the optical sensor module, the fitting plate portions 51a provided in the substrate unit $E_1$ are brought into fitting engagement with the respective vertical groove portions 44a provided in the optical waveguide unit $W_1$. In this state, the optical waveguide unit $W_1$ and the substrate unit $E_1$ are coupled to each other in the optical sensor module. The vertical groove portions 44a are in an appropriate position relative to the light-transmissive surface 42a of the core 42, and the fitting plate portions 51a are in an appropriate position relative to the optical element 54. Thus, the fitting engagement between the vertical groove portions 44a and the fitting plate portions 51a allows the core 42 and the optical element 54 to be automatically brought into alignment with each other. In FIGS. 10A and 10B, the reference numeral 45 designates a base, the reference character 45a designates a through hole formed in the base 45 and for insertion of the substrate unit $E_1$ therethrough, 51 designates a shaped substrate provided with the fitting plate portions 51a, and 55 designates a sealing resin.

SUMMARY OF THE INVENTION

In this optical sensor module, the core 42 of the optical waveguide unit $W_1$ and the optical element 54 of the substrate unit $E_1$ are automatically brought into alignment with each other without any alignment operation in this manner. This optical sensor module eliminates the need for the time-consuming alignment operation to allow the mass production of such optical sensor modules, thereby providing excellent productivity.

However, it has been found that the aforementioned optical sensor module exhibits wide variations in optical coupling loss between the core 42 and the optical element 54. There are variations in a spacing Ls between the pair of vertical groove portions 44a of the optical waveguide unit $W_1$ (a distance Ls between opposed inner wall surfaces 44b of the vertical groove portions 44a) with reference to FIG. 11A, and there are variations in the overall width Lc of the substrate unit $E_1$ (a distance Lc between opposite side edges 51b of the fitting plate portions 51a) with reference to FIG. 11B. Specifically, although a relationship Ls=Lc is intended in the design stage, a relationship Ls>Lc or Ls<Lc results from component tolerances in the actual production stage. In the case where Ls>Lc, the substrate unit $E_1$ is unsteady as indicated by the arrow F of FIG. 11C, which causes inaccurate alignment to result in wide variations in optical coupling loss. In the case where Ls<Lc, on the other hand, the substrate unit $E_1$ is sometimes bowed (or warped) outwardly (in a direction such that the optical element 54 is moved away from the light-transmissive surface 42a of the core 42) as shown in FIG. 11D to cause the increase in optical coupling loss or is sometimes bowed (or warped) inwardly (in a direction such that the optical element 54 is moved toward the light-transmissive surface 42a of the core 42) although not shown to cause the decrease in optical coupling loss (although the substrate unit $E_1$ is in most cases bowed outwardly as shown in FIG. 11D), resulting in the wide variations in optical coupling loss. In this manner, the optical sensor module in which the substrate unit $E_1$ is brought into fitting engagement with the optical waveguide unit $W_1$ still has room for improvement from the viewpoint of the wide variations in optical coupling loss.

The present invention provides an optical sensor module that reduces variations in optical coupling loss between a core in an optical waveguide unit and an optical element in a substrate unit and that reduces the optical coupling loss.

The present invention is intended for an optical sensor module comprising: an optical waveguide unit; and a substrate unit, the optical waveguide unit and the substrate unit being coupled to each other. The optical waveguide unit includes an under cladding layer, a linear core for an optical path provided on a surface of the under cladding layer, an over cladding layer covering the core, and a pair of left-hand and right-hand fitting portions for fitting engagement with the substrate unit, the fitting portions being provided in part of the over cladding layer lying in an appropriate position relative to a light-transmissive surface of the core. The substrate unit includes a substrate, an optical element mounted on a predetermined portion of the substrate, and to-be-fitted portions for fitting engagement with the fitting portions of the optical waveguide unit, the to-be-fitted portions being provided in part of the substrate lying in an appropriate position relative to the optical element. The coupling between the optical waveguide unit and the substrate unit is provided in conditions where the to-be-fitted portions provided in the substrate unit are in fitting engagement with the fitting portions provided in the optical waveguide unit and where the substrate unit is bowed in a direction such that the optical element is moved toward the light-transmissive surface of the core.

The structure of an optical sensor module was studied for purposes of reducing variations in optical coupling loss between a core in an optical waveguide unit and an optical element in a substrate unit and reducing the optical coupling loss in the optical sensor module. Improvements are made to an optical sensor module disclosed in FIGS. 10A and 10B in which to-be-fitted portions in a substrate unit are brought into fitting engagement with fitting portions in an optical waveguide unit. Specifically, the improvements have been intended to cause the substrate unit to be bowed in a direction such that the optical element in the substrate unit is moved toward the light-transmissive surface of the core whenever the fitting engagement is kept.

As a result, the bowing of the substrate unit reduces the distance between the light-transmissive surface of the core and the optical element to accordingly reduce the optical coupling loss between the core and the optical element in the substrate unit. Further, the bowing of the substrate unit causes the substrate unit to urge the pair of left-hand and right-hand fitting portions in such a direction as to increase the spacing between the fitting portions. This prevents the substrate unit from becoming unsteady and from being bowed in a direction such that the optical element is moved away from the light-transmissive surface of the core, which in turn stabilizes the coupling of the substrate unit to the optical waveguide unit, thereby reducing the variations in optical coupling loss.

In the optical waveguide unit in the optical sensor module according to the present invention, the light-transmissive surface of the core and the fitting portions for fitting engagement with the substrate unit are in an appropriate positional relationship. In the substrate unit, the optical element and the to-be-fitted portions for fitting engagement with the fitting portions are in an appropriate positional relationship. Thus, the light-transmissive surface of the core and the optical element are automatically aligned with each other when the to-be-fitted portions in the substrate unit are brought into fitting engagement with the fitting portions in the optical waveguide unit, that is, when the optical waveguide unit and the substrate unit are coupled to each other. In that state, the substrate unit urges the fitting portions during the fitting engagement because the substrate unit is bowed in a direction such that the optical element is moved toward the light-transmissive surface of the core. This stabilizes the coupling of the substrate unit to the optical waveguide unit to absorb component tolerances, thereby reducing the variations in optical coupling loss between the core in the optical waveguide unit and the optical element in the substrate unit. Additionally, the aforementioned structure achieves a shorter distance between the light-transmissive surface of the core and the optical element to accomplish the reduction in the optical coupling loss. That is, the optical sensor module according to the present invention accomplishes the reduction in the optical coupling loss itself and the reduction in variations in the optical coupling loss.

Preferably, the left-hand and right-hand fitting portions provided in the optical waveguide unit are vertical groove portions of a generally V-shaped cross-sectional configuration extending across the thickness of the optical waveguide unit, the vertical groove portions having generally V-shaped respective openings opposed to each other, each of the vertical groove portions having a first wall surface and a second wall surface which constitute generally V-shaped wall surfaces, the first wall surface being in a face-to-face relationship with a surface of the substrate unit opposite from the surface on which the optical element is mounted, the first wall surface being a surface orthogonal to a longitudinal direction of the core, the second wall surface being a surface angled with respect to the longitudinal direction of the core, the to-be-fitted portions in the substrate unit including side edges positioned respectively at generally V-shaped corners of the vertical groove portions. In this optical sensor module, the substrate unit is bowed by the simple structure of the vertical groove portions.

Preferably, the left-hand and right-hand fitting portions provided in the optical waveguide unit are vertical groove portions extending across the thickness of the optical waveguide unit, the vertical groove portions having respective openings opposed to each other, part of each of the vertical groove portions in a face-to-face relationship with a surface of the substrate unit opposite from the surface on which the optical element is mounted being provided to serve as a pressing portion for pressing the opposite surface of the substrate unit toward the light-transmissive surface of the core, the to-be-fitted portions in the substrate unit including side edges positioned respectively at inner wall surfaces of the vertical groove portions. In this optical sensor module, the substrate unit is also bowed by the simple structure of the vertical groove portions.

Preferably, the to-be-fitted portions in the substrate unit are made of metal. This optical sensor module provides an appropriate urging force of the substrate unit against the fitting portions when the substrate unit is bowed, to further stabilize the fitting engagement of the substrate unit with the optical waveguide unit. As a result, the variations in optical coupling loss are further reduced.

Preferably, the metal serving as the material for the formation of the to-be-fitted portions is stainless steel. In particular, the optical sensor module provides a more appropriate urging force of the substrate unit against the fitting portions, to still further stabilize the fitting engagement of the substrate unit with the optical waveguide unit. As a result, the variations in optical coupling loss are still further reduced.

DETAILED DESCRIPTION OF THE INVENTION

Preferred embodiments according to the present invention will now be described in detail with reference to the drawings.

Figure 1A:
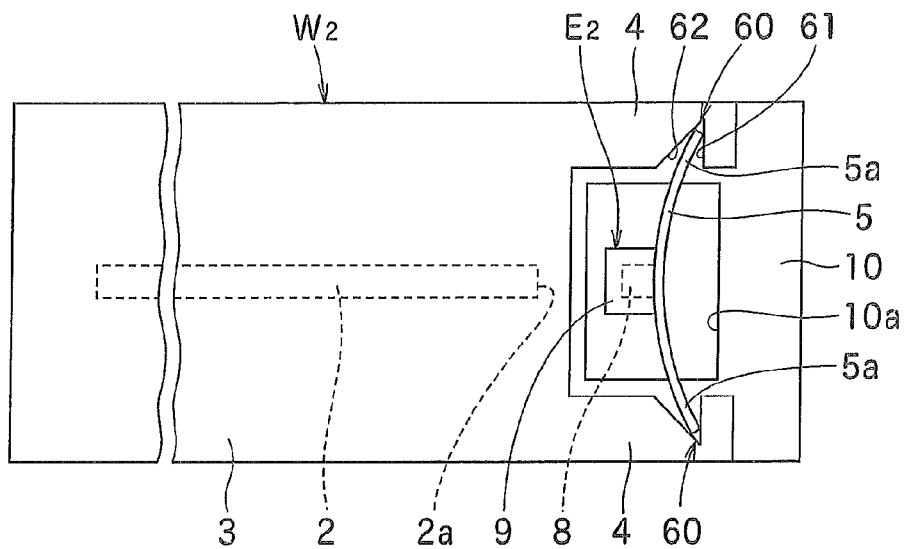
FIG. 1A is a plan view schematically showing an optical sensor module according to one preferred embodiment of the present invention.
Figure 1B:
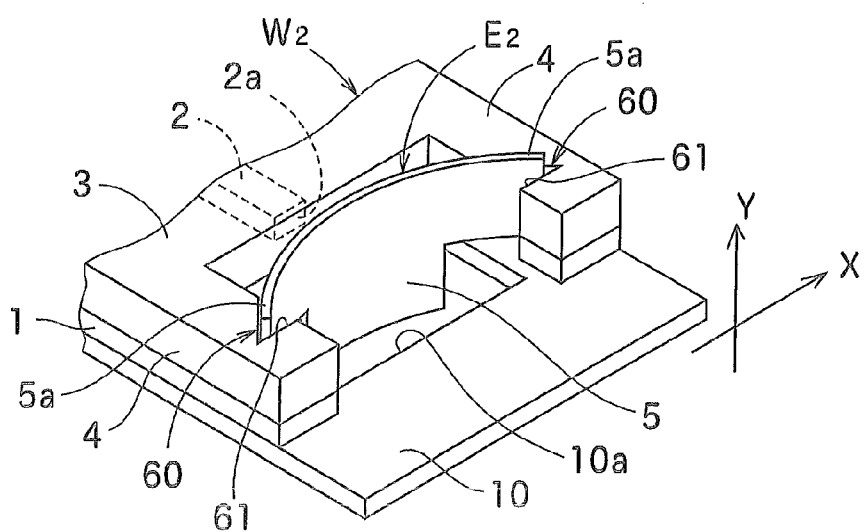
FIG. 1B is a perspective view of a right-hand end portion of the optical sensor module of FIG. 1A as seen diagonally from the upper right.

FIG. 1A is a plan view schematically showing an optical sensor module according to one preferred embodiment of the present invention. FIG. 1B is a perspective view of a right-hand end portion of the optical sensor module of FIG. 1A as seen diagonally from the upper right. Specifically, an optical waveguide unit $W_2$ includes a pair of vertical groove portions (fitting portions) 60 of a generally V-shaped cross-sectional configuration. The vertical groove portions 60 of the generally V-shaped configuration have generally V-shaped openings, respectively, opposed to each other. Each of the vertical groove portions 60 of the generally V-shaped configuration has a first wall surface 61, and a second wall surface 62. The first wall surface 61 is in a face-to-face relationship with a surface of a substrate unit $E_2$ opposite from the surface on which an optical element 8 is mounted, and is a surface orthogonal to a longitudinal direction of a core 2. The second wall surface 62 is a surface angled with respect to the longitudinal direction of the core 2. The overall width Lc (with reference to FIG. 3A) of the substrate unit $E_2$ as measured when not in fitting engagement with the optical waveguide unit $W_2$ is slightly greater than the distance Ls (with reference to FIG. 2A) between opposed inner wall surfaces (generally V-shaped corners) of the vertical groove portions 60 (Ls<Lc) in consideration for component tolerances.

When the substrate unit $E_2$ is in fitting engagement with the optical waveguide unit $W_2$, side edges of fitting plate portions (to-be-fitted portions) 5a provided in the substrate unit $E_2$ are positioned respectively at the generally V-shaped corners of the vertical groove portions 60. Specifically, when the substrate unit $E_2$ is brought into fitting engagement with the vertical groove portions 60, side edges of the substrate unit $E_2$ (the side edges of the fitting plate portions 5a) are automatically positioned respectively at the corners of the vertical groove portions 60 by the guiding action of the angled surfaces (the second wall surfaces 62) of the vertical groove portions 60. This positioning causes the substrate unit $E_2$ to be bowed (or warped) inwardly (in a direction such that the optical element 8 is moved toward a light-transmissive surface 2a of the core 2). The reverse bowing (the outward bowing) is prevented by the function of the orthogonal surfaces (the first wall surfaces 61) of the vertical groove portions 60. In this manner, the substrate unit $E_2$ is bowed in a direction such that the optical element 8 is moved toward the light-transmissive surface 2a of the core 2, so that alignment is achieved in the optical sensor module.

Figure 10A:
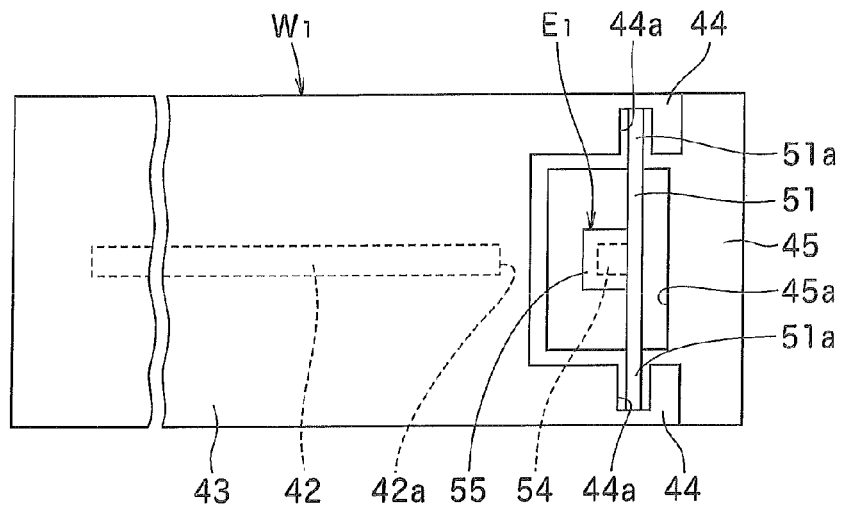
FIG. 10A is a plan view schematically showing a conventional optical sensor module.
Figure 10B:
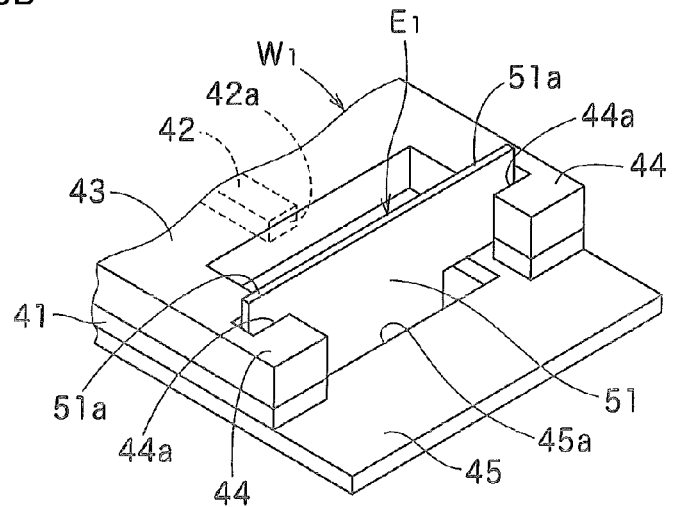
FIG. 10B is a perspective view of a right-hand end portion of the optical sensor module of FIG. 10A as seen diagonally from the upper right.
Figure 11A:
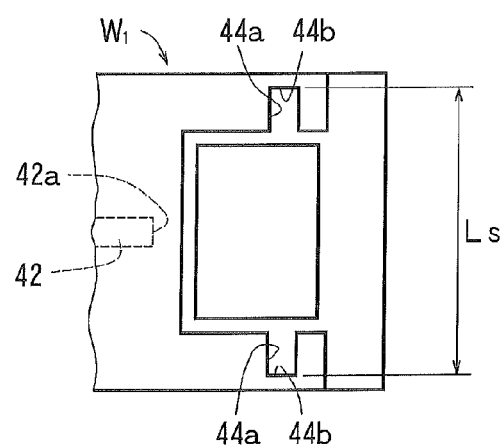
FIGS. 11A to 11D are views illustrating the conventional optical sensor module.
Figure 11B:
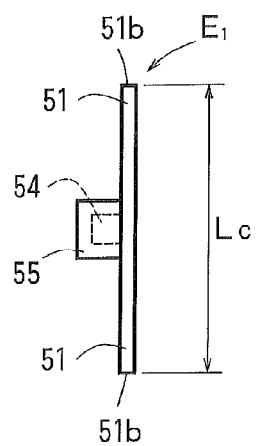
Figure 11C:
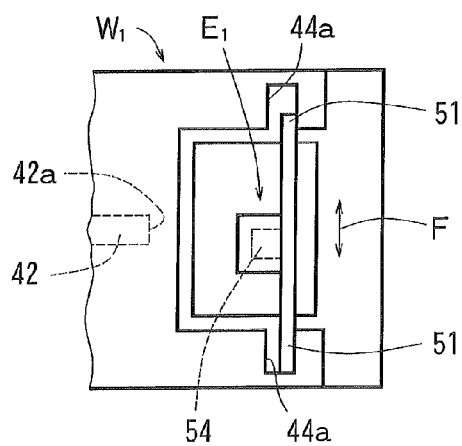
Figure 11D:
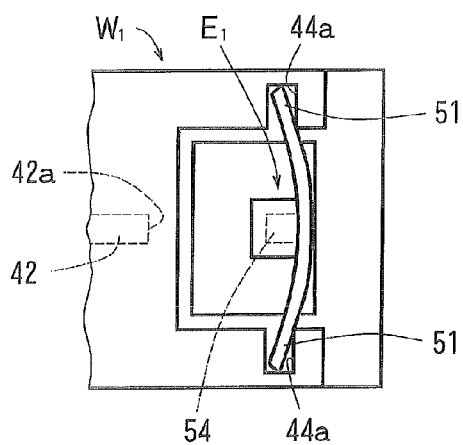

In the optical sensor module disclosed in FIGS. 10A and 10B, the vertical groove portions 44a for fitting engagement with the substrate unit $E_1$ are of a simply generally U-shaped cross-sectional configuration (having a flat inner wall surface, and opposite side wall surfaces orthogonal to the inner wall surface). Thus, in the case where Ls<Lc, the substrate unit $E_1$ is bowed outwardly in most cases, as shown in FIG. 11D, to increase the distance between the light-transmissive surface 42a of the core 42 and the optical element 54, or is bowed inwardly in some cases to decrease the distance between the light-transmissive surface 42a of the core 42 and the optical element 54. The disclosed optical sensor module provides the vertical groove portions 60 having a characteristic configuration as shown in FIGS. 1A and 1B to always bow the substrate unit $E_2$ in a direction such that the optical element 8 is moved toward the light-transmissive surface 2a of the core 2. This bowing always allows the reduced distance between the light-transmissive surface 2a of the core 2 and the optical element 8 to be maintained with stability, i.e., to absorb component tolerances.

Figure 2A:
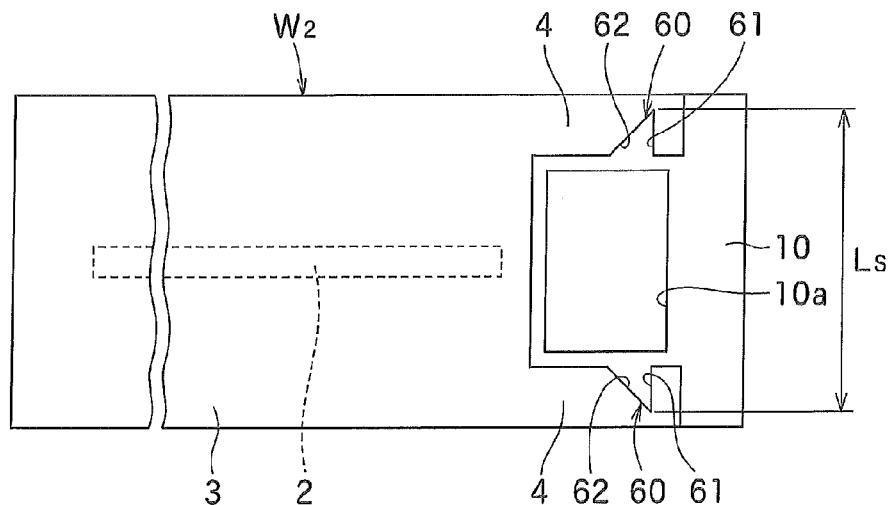
FIG. 2A is a plan view schematically showing an optical waveguide unit in the optical sensor module.
Figure 2B:
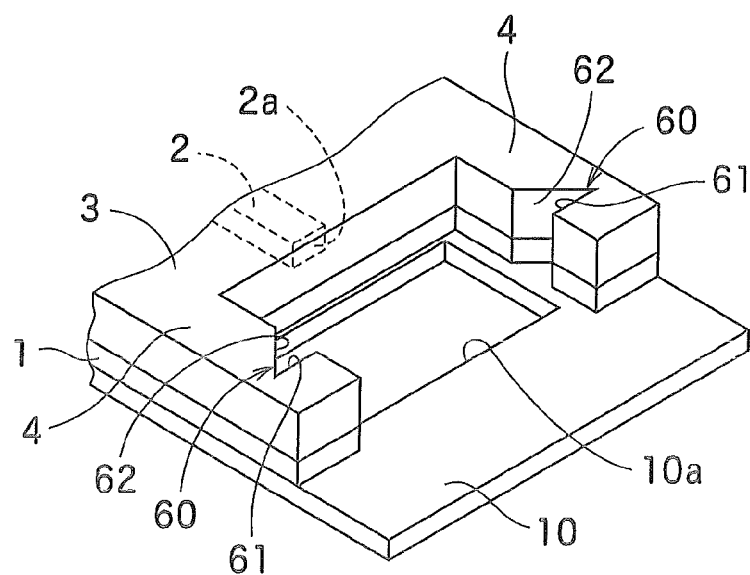
FIG. 2B is a perspective view of a right-hand end portion of the optical waveguide unit of FIG. 2A as seen diagonally from the upper right.

The present preferred embodiment will be described in further detail. The optical waveguide unit $W_2$ is substantially similar to the optical waveguide unit $W_1$ in the optical sensor module in FIGS. 10A and 10B except that the vertical groove portions 60 are of the generally V-shaped cross-sectional configuration. More specifically, as shown in FIGS. 2A and 2B, the optical waveguide unit $W_2$ is bonded to a surface of a base 10, and includes an under cladding layer 1 bonded to the surface of the base 10, the core 2 for an optical path formed linearly in a predetermined pattern on a surface of the under cladding layer 1, and an over cladding layer 3 formed on the surface of the under cladding layer 1 so as to cover the core 2. The optical waveguide unit $W_2$ further includes extensions 4 provided at its one end (at its right-hand end as seen in FIG. 2A) and configured such that laminated parts (upper and lower parts as seen in FIG. 2A) of the under cladding layer 1 and the over cladding layer 3 where the core 2 is absent are extended in an axial direction. The vertical groove portions 60 are provided in the extensions 4 so as to extend across the thickness of the extensions 4. The vertical groove portions 60 are in an appropriate position relative to the light-transmissive surface 2a of the core 2.

Figure 3A:
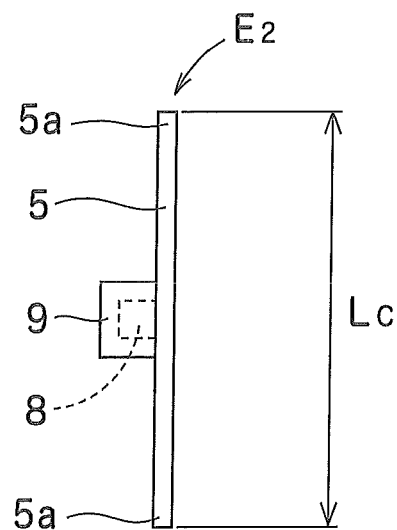
FIG. 3A is a plan view schematically showing a substrate unit in the optical sensor module.
Figure 3B:
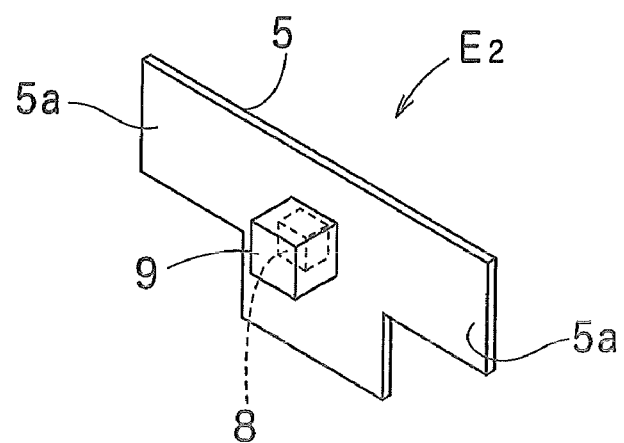
FIG. 3B is a perspective view of a left-hand end portion of the substrate unit of FIG. 3A as seen diagonally from the upper left.

On the other hand, the substrate unit $E_2$ is substantially similar to the substrate unit $E_1$ in the optical sensor module in FIGS. 10A and 10B except that the overall width Lc (with reference to FIG. 3A) of the substrate unit $E_2$ is slightly greater than the distance Ls (with reference to FIG. 2A) between the opposed inner wall surfaces (the generally V-shaped corners) of the vertical groove portions 60 in the optical waveguide unit $W_2$ as described above. More specifically, as shown in FIGS. 3A and 3B, the substrate unit $E_2$ includes a shaped substrate 5, the optical element 8 mounted on a surface of the shaped substrate 5, with an insulation layer (not shown) and an optical element mounting pad (not shown) therebetween, and a sealing resin 9 for sealing the optical element 8. The shaped substrate 5 includes the fitting plate portions 5a for fitting engagement with the vertical groove portions 60 (with reference to FIGS. 2A and 2B) and protruding along the width of the shaped substrate 5 (leftwardly and rightwardly as seen in FIG. 3B). The insulation layer is formed on the surface of the shaped substrate 5 except where the fitting plate portions 5a are provided. The optical element mounting pad is formed on a central portion of a surface of the insulation layer. The optical element 8 is mounted on the optical element mounting pad. The fitting plate portions 5a of the shaped substrate 5 are formed by etching, and are appropriately positioned and shaped relative to the optical element mounting pad. The fitting plate portions 5a are hence in an appropriate position relative to the optical element 8 mounted on the optical element mounting pad. The optical element 8 includes a light-emitting section or a light-receiving section formed on the surface of the optical element 8. An electric circuit (not shown) for connection to the optical element mounting pad is formed on the surface of the insulation layer.

In the optical sensor module, as shown in FIGS. 1A and 1B, the fitting plate portions 5a provided in the substrate unit $E_2$ are brought into fitting engagement with the respective vertical groove portions 60 provided in the optical waveguide unit $W_2$. In such a state, the optical waveguide unit $W_2$ and the substrate unit $E_2$ are coupled and integrated together. In this state, as mentioned earlier, the substrate unit $E_2$ is bowed in a direction such that the optical element 8 is moved toward the light-transmissive surface 2a of the core 2. The vertical groove portions 60 provided in the optical waveguide unit $W_2$ are appropriately positioned relative to the light-transmissive surface 2a of the core 2. The fitting plate portions 5a provided in the substrate unit $E_2$ are appropriately positioned relative to the optical element 8. Thus, the fitting engagement between the vertical groove portions 60 and the fitting plate portions 5a brings the light-transmissive surface 2a of the core 2 and the optical element 8 into an appropriate position relative to each other and into alignment with each other. When the fitting engagement is achieved, the side edges of the fitting plate portions 5a are positioned at the inner wall surfaces (the generally V-shaped corners) of the vertical groove portions 60, whereby the optical element 8 is appropriately positioned in leftward and rightward directions (along the X-axis) as seen in FIG. 1B relative to the base 10. Also when the fitting engagement is achieved, lower edges of the fitting plate portions 5a protruding widthwise are in abutment with the surface of the base 10. The optical element 8 is appropriately positioned in a direction (along the Y-axis) orthogonal to the surface of the base 10 by the abutment.

In this preferred embodiment, a rectangular through hole 10a is formed in part of the base 10 corresponding to the substrate unit $E_2$, as shown in FIGS. 1A and 1B. Part of the substrate unit $E_2$ protrudes from the back surface of the base 10 through the through hole 10a. The protruding part of the substrate unit $E_2$ is connected on the back side of the base 10 to a motherboard (not shown) and the like for the sending and the like of a signal to the optical element 8, for example.

The optical sensor module according to this preferred embodiment is manufactured by undergoing the process steps (1) to (3) to be described below.

(1) The step of producing the optical waveguide unit $W_2$ (with reference to FIGS. 4A to 4C and FIGS. 5A to 5D). It should be noted that FIGS. 4A to 4C and FIGS. 5B to 5D for illustrating the step (1) are views corresponding to a longitudinal sectional view obtained by taking the plan view of FIG. 1A along a vertical plane.

(2) The step of producing the substrate unit $E_2$ (with reference to FIGS. 6A to 6D).

(3) The step of coupling the substrate unit $E_2$ to the optical waveguide unit $W_2$.

The step (1) of producing the optical waveguide unit $W_2$ will be described. First, a substrate 20 of a flat shape (with reference to FIG. 4A) for use in the formation of the under cladding layer 1 is prepared. Examples of a material for the formation of the substrate 20 include glass, quartz, silicon, resin, and metal. In particular, a stainless steel substrate is preferably used as the substrate 20. This is because the stainless steel substrate is excellent in resistance to thermal expansion and contraction, so that various dimensions thereof are maintained substantially at their design values in the course of the production of the optical waveguide unit $W_2$. The thickness of the substrate 20 is, for example, in the range of 20 µm to 1 mm.

Figure 4A:
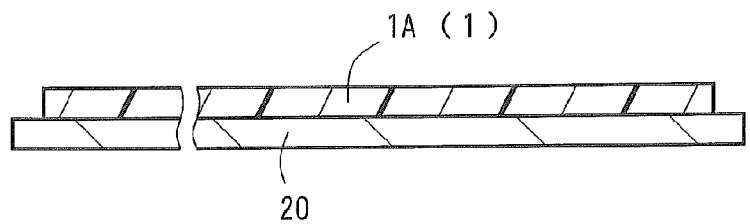
FIGS. 4A to 4C are views schematically illustrating the steps of forming an under cladding layer and a core in the optical waveguide unit.

Then, as shown in FIG. 4A, a varnish prepared by dissolving a photosensitive resin such as a photosensitive epoxy resin and the like for the formation of the under cladding layer in a solvent is applied to a predetermined region of a surface of the substrate 20. Thereafter, a heating treatment (at 50 to 120° C. for approximately 10 to 30 minutes) is performed on the varnish, as required, to dry the varnish, thereby forming a photosensitive resin layer 1A for the formation of the under cladding layer 1. The photosensitive resin layer 1A is then exposed to irradiation light such as ultraviolet light to thereby form the under cladding layer 1. The thickness of the under cladding layer 1 is generally in the range of 1 to 50 µm.

Figure 4B:
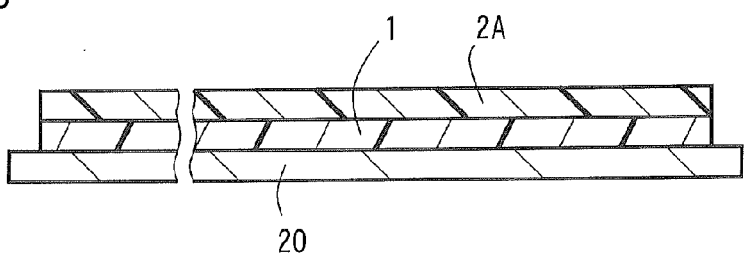
Figure 4C:
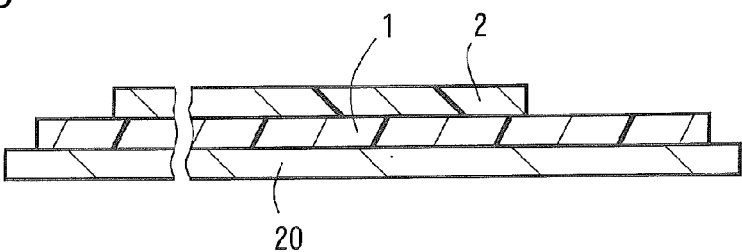

Next, as shown in FIG. 4B, a photosensitive resin layer 2A for the formation of the core is formed on a surface of the under cladding layer 1 in a manner similar to the process for forming the photosensitive resin layer 1A for the formation of the under cladding layer. Then, the photosensitive resin layer 2A is exposed to irradiation light through a photomask having an opening pattern corresponding to the pattern of the core 2. Next, a heating treatment is performed. Thereafter, development is performed using a developing solution to dissolve away unexposed portions of the photosensitive resin layer 2A, as shown in FIG. 4C, thereby forming the remaining photosensitive resin layer 2A into the pattern of the core 2. The thickness (height) of the core 2 is generally in the range of 5 to 60 µm. The width of the core 2 is generally in the range of 5 to 60 µm.

Figure 5A:
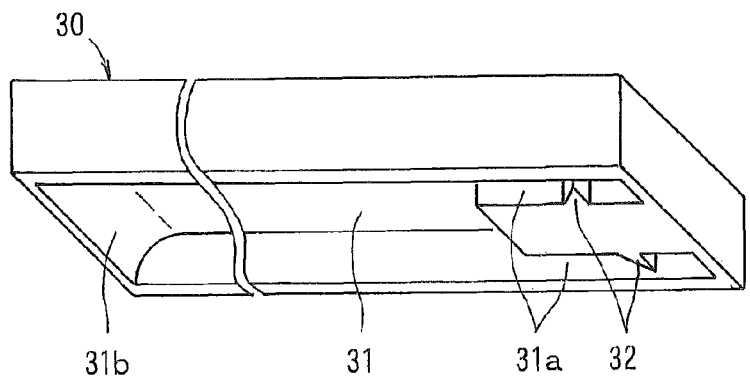
FIG. 5A is a perspective view schematically showing a mold for use in the formation of an over cladding layer in the optical waveguide unit.
Figure 5B:
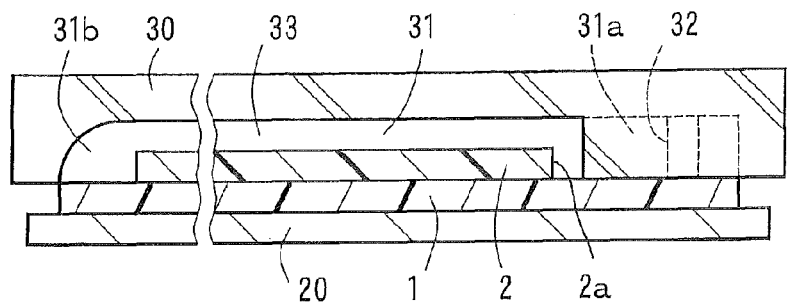
FIGS. 5B to 5D are views schematically illustrating the steps of forming the over cladding layer.
Figure 5C:
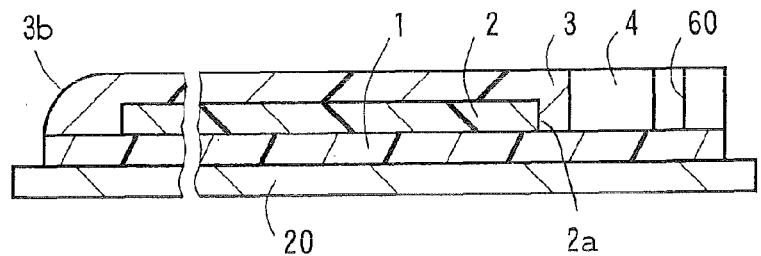

An example of a material for the formation of the core 2 includes a photosensitive resin similar to that for the under cladding layer 1, and the material used herein has a refractive index higher than that of the material for the formation of the under cladding layer 1 and the over cladding layer 3 (with reference to FIG. 5C). The adjustment of the refractive index may be made, for example, by adjusting the selection of the types of the materials for the formation of the under cladding layer 1, the core 2 and the over cladding layer 3, and the composition ratio thereof.

Next, a mold 30 (with reference to FIG. 5A) is prepared. This mold 30 is used to mold the over cladding layer 3 (with reference to FIG. 5C) and the extensions 4 of the over cladding layer 3 which have the vertical groove portions 60 (with reference to FIG. 5C) for fitting engagement with the substrate unit at the same time. The lower surface of this mold 30 is provided with a cavity 31 having a die surface complementary in shape to the over cladding layer 3, as shown in FIG. 5A that is a perspective view as viewed from below. The cavity 31 includes portions 31a for the formation of the extensions 4, and a portion 31b for the formation of a lens portion 3b (with reference to FIG. 5C). Ridges 32 for the molding of parts of the vertical groove portions 60 for fitting engagement with the substrate unit which correspond to the over cladding layer 3 are formed in the portions 31a for the formation of the extensions 4. Also, the upper surface of the mold 30 is provided with alignment marks (not shown) for the purpose of alignment with the light-transmissive surface 2a (the right-hand end surface as seen in FIG. 5B) of the core 2 for the appropriate positioning of the mold 30 when in use. The cavity 31 and the ridges 32 are formed in appropriate positions with respect to the alignment marks.

Thus, when the mold 30 is set after the alignment marks of the mold 30 are aligned with the light-transmissive surface 2a of the core 2 to perform the molding process in that state, the over cladding layer 3 and the vertical groove portions 60 for fitting engagement with the substrate unit are molded at the same time in appropriate positions with respect to the light-transmissive surface 2a of the core 2. Also, the mold 30 is set by bringing the lower surface of the mold 30 into intimate contact with the surface of the under cladding layer 1, whereby the space surrounded by the die surfaces of the cavity 31, the surface of the under cladding layer 1 and the surface of the core 2 is defined as a mold space 33. Further, the mold 30 further includes an inlet (not shown) for the injection of a resin for the formation of the over cladding layer therethrough into the mold space 33, the inlet being in communication with the cavity 31.

An example of the resin for the formation of the over cladding layer includes a photosensitive resin similar to that for the under cladding layer 1. In this case, it is necessary that the photosensitive resin that fills the mold space 33 be exposed to irradiation light such as ultraviolet light and the like directed through the mold 30. For this reason, a mold made of a material permeable to the irradiation light (for example, a mold made of quartz) is used as the mold 30. It should be noted that a thermosetting resin may be used as the resin for the formation of the over cladding layer. In this case, the mold 30 may have any degree of transparency. For example, a mold made of metal or quartz is used as the mold 30.

Then, as shown in FIG. 5B, the alignment marks of the mold 30 are aligned with the light-transmissive surface 2a of the core 2 so that the entire mold 30 is appropriately positioned. In that state, the lower surface of the mold 30 is brought into intimate contact with the surface of the under cladding layer 1. Then, the resin for the formation of the over cladding layer is injected through the inlet formed in the mold 30 into the mold space 33 surrounded by the die surfaces of the cavity 31 and the ridges 32, the surface of the under cladding layer 1 and the surface of the core 2 to fill the mold space 33 therewith. Next, when the resin is a photosensitive resin, the photosensitive resin is exposed to irradiation light such as ultraviolet light through the mold 30, and thereafter a heating treatment is performed on the resin. When the resin is a thermosetting resin, a heating treatment is performed on the resin. This cures the resin for the formation of the over cladding layer to form the vertical groove portions 60 for fitting engagement with the substrate unit (the extensions 4 of the over cladding layer 3) at the same time as the over cladding layer 3. When the under cladding layer 1 and the over cladding layer 3 are made of the same material, the under cladding layer 1 and the over cladding layer 3 are integrated together at the contact thereof.

Next, the mold 30 is removed. This provides the over cladding layer 3 and parts of the vertical groove portions 60 for fitting engagement with the substrate unit which correspond to the over cladding layer 3. The parts of the vertical groove portions 60 for fitting engagement with the substrate unit are positioned in an appropriate location relative to the light-transmissive surface 2a of the core 2 because the parts of the vertical groove portions 60 are formed with respect to the light-transmissive surface 2a of the core 2 by using the mold 30, as mentioned earlier. Also, the lens portion 3b of the over cladding layer 3 is also positioned in an appropriate location.

The thickness of the over cladding layer 3 (as measured from the surface of the under cladding layer 1) is generally greater than the thickness of the core 2 and not greater than 1200 μm. The size of the vertical groove portions 60 for fitting engagement with the substrate unit is defined in corresponding relation to the size of the fitting plate portions 5a of the substrate unit $E_2$ for fitting engagement with the vertical groove portions 60. For example, the vertical groove portions 60 have a depth in the range of 0.2 to 1.2 mm, and a width in the range of 0.2 to 2.0 mm.

Figure 5D:
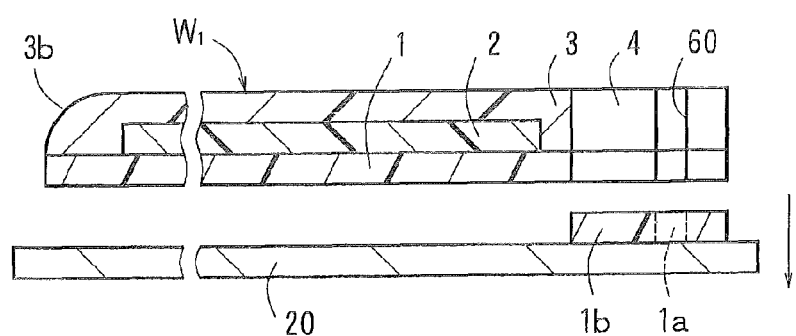

Then, as shown in FIG. 5D, the substrate 20 is stripped from the back surface of the under cladding layer 1 (as indicated by the arrow of FIG. 5D). At this time, a portion 1b of the under cladding layer 1 where the over cladding layer 3 is absent, which is included in portions 1a of the under cladding layer 1 corresponding to the vertical groove portions 60 of the over cladding layer 3, has no adhesion to the over cladding layer 3, and hence is generally stripped off (together with the substrate 20) while adhering to the substrate 20. The remaining portion of the under cladding layer 1 except the portion 1b of the under cladding layer 1 where the over cladding layer 3 is absent is kept bonded to the over cladding layer 3, and is stripped off so that separation occurs between the back surface of the under cladding layer 1 and the substrate 20. At this time, the portions 1a of the under cladding layer 1 corresponding to the vertical groove portions 60 are stripped off and removed together with the substrate 20. Thus, the vertical groove portions 60 for fitting engagement with the substrate unit are formed to extend across the thickness of the under cladding layer 1 and the over cladding layer 3. In this manner, the optical waveguide unit $W_2$ is provided which includes the under cladding layer 1, the core 2 and the over cladding layer 3 and which is provided with the vertical groove portions 60 for fitting engagement with the substrate unit. Thus, the step (1) of producing the optical waveguide unit $W_2$ is completed.

Then, as shown in FIGS. 2A and 2B, the optical waveguide unit $W_2$ is bonded onto the base 10 that is an acrylic board or the like with an adhesive therebetween. In this bonding process, the under cladding layer 1 and the base 10 are bonded together. A base having no irregularities on the surface thereof is used as the base 10. The base 10 may be of any material, and may have any degree of transparency and any thickness. Examples of the base 10 include a polypropylene (PP) board, a metal plate, and a ceramic sheet, besides the acrylic board. The thickness of the base 10 is, for example, in the range of 500 μm to 5 mm.

Next, the step (2) of producing the substrate unit $E_2$ will be described. First, a substrate 5A (with reference to FIG. 6A) serving as a base material for the shaped substrate 5 is prepared. Examples of a material for the formation of the substrate 5A include metal and resin. In particular, a stainless steel substrate is preferably used as the substrate 5A from the viewpoint of easy machinability and dimensional stability. The thickness of the substrate 5A is, for example, in the range of 0.02 to 0.1 mm.

Figure 6A:
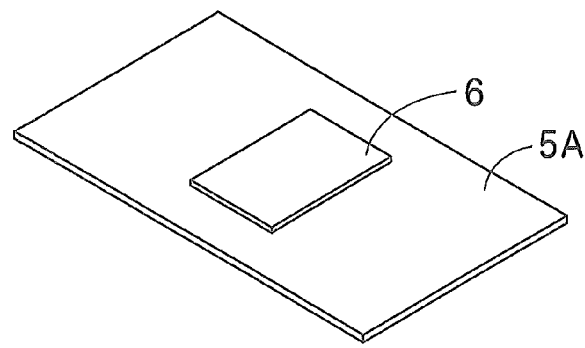
FIGS. 6A to 6D are views schematically illustrating the steps of producing the substrate unit.

Then, as shown in FIG. 6A, a varnish prepared by dissolving a photosensitive resin for the formation of an insulation layer such as a photosensitive polyimide resin and the like in a solvent is applied to a predetermined region of a surface of the substrate 5A. Thereafter, a heating treatment is performed on the varnish, as required, to dry the varnish, thereby forming a photosensitive resin layer for the formation of the insulation layer. Then, the photosensitive resin layer is exposed to irradiation light such as ultraviolet light and the like through a photomask. This provides an insulation layer 6 having a predetermined shape. The thickness of the insulation layer 6 is generally in the range of 5 to 15 μm.

Figure 6B:
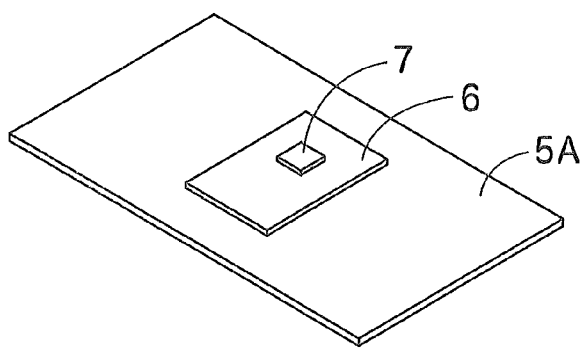

Next, as shown in FIG. 6B, an optical element mounting pad 7 and an electric circuit (not shown) for connection to the optical element mounting pad 7 are formed on a surface of the insulation layer 6. The formation of the optical element mounting pad 7 (including the electric circuit) is achieved, for example, in a manner to be described below. Specifically, a metal layer (having a thickness on the order of 60 to 260 nm) is initially formed on the surface of the insulation layer 6 by sputtering, electroless plating and the like. This metal layer becomes a seed layer (a layer serving as a basis material for the formation of an electroplated layer) for a subsequent electroplating process. Then, a dry film resist is affixed to the opposite surfaces of a laminate comprised of the substrate 5A, the insulation layer 6, and the seed layer. Thereafter, a photolithographic process is performed to form a hole having the pattern of the mounting pad 7 (including the electric circuit) in the dry film resist on the side where the seed layer is formed, so that a surface portion of the seed layer is uncovered at the bottom of the hole. Next, electroplating is performed to form an electroplated layer (having a thickness on the order of 5 to 20 μm) in a stacked manner on the surface portion of the seed layer uncovered at the bottom of the hole. Then, the dry film resist is stripped away using an aqueous sodium hydroxide solution and the like. Thereafter, a seed layer portion on which the electroplated layer is not formed is removed by soft etching, so that a laminate portion comprised of the remaining electroplated layer and the underlying seed layer is formed into the mounting pad 7 (including the electric circuit).

Figure 6C:
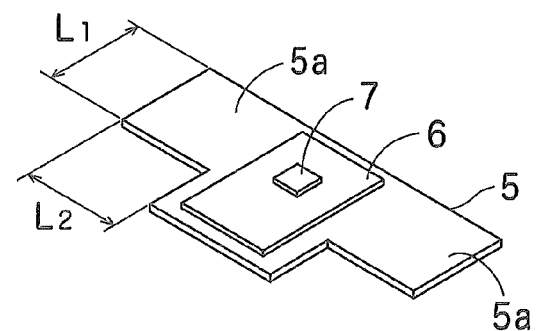

Then, as shown in FIG. 6C, the substrate 5A is formed into the shaped substrate 5 having the fitting plate portions 5a in an appropriate position relative to the mounting pad 7. In this process, the shaped substrate 5 is formed so that the overall width Lc (with reference to FIG. 3A) of the shaped substrate 5 (the overall width Lc of the substrate unit $E_2$) is greater than the distance Ls (with reference to FIG. 2A) between the opposed inner wall surfaces (the generally V-shaped corners) of the vertical groove portions 60 provided in the optical waveguide unit $W_2$. The formation of the shaped substrate 5 is achieved, for example, in a manner to be described below. Specifically, the back surface of the substrate 5A is covered with a dry film resist. A photolithographic process is performed to leave a portion of the dry film resist having an intended shape unremoved so that the fitting plate portions 5a are formed in an appropriate position relative to the mounting pad 7. Then, uncovered portions of the substrate 5A, except where the portion of the dry film resist is left unremoved, are etched away by using an aqueous ferric chloride solution. This etching causes the substrate 5A to be formed into the shaped substrate 5 having the fitting plate portions 5a. Next, the dry film resist is stripped away using an aqueous sodium hydroxide solution and the like. The size of the fitting plate portions 5a of the shaped substrate 5 is, for example, as follows: a vertical dimension $L_1$ in the range of 0.5 to 5.0 mm; and a horizontal dimension $L_2$ (a protrusion length) in the range of 0.5 to 5.0 mm.

Figure 6D:
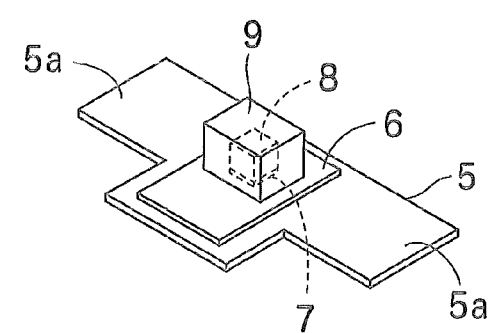

Then, as shown in FIG. 6D, the optical element 8 is mounted on the mounting pad 7, and thereafter the optical element 8 and its surrounding portion are sealed with a transparent resin by potting. The mounting of the optical element 8 is performed using a mounting machine after the optical element 8 is precisely positioned relative to the mounting pad 7 by using a positioning device such as a positioning camera and the like provided in the mounting machine. In this manner, the substrate unit $E_2$ is provided which includes the shaped substrate 5 having the fitting plate portions 5a, the insulation layer 6, the mounting pad 7, the optical element 8, and the sealing resin 9. Thus, the step (2) of producing the substrate unit $E_2$ is completed. In the substrate unit $E_2$, the fitting plate portions 5a are formed with respect to the mounting pad 7, as mentioned earlier. Accordingly, the optical element 8 mounted on the mounting pad 7, and the fitting plate portions 5a are in an appropriate positional relationship.

Next, the step (3) of coupling the optical waveguide unit $W_2$ and the substrate unit $E_2$ together will be described. Specifically, the surface (the light-emitting section or the light-receiving section) of the optical element 8 of the substrate unit $E_2$ (with reference to FIGS. 3A and 3B) is directed to face toward the light-transmissive surface 2a of the core 2 of the optical waveguide unit $W_2$ (with reference to FIGS. 2A and 2B). In this state, the fitting plate portions 5a provided in the substrate unit $E_2$ are brought into fitting engagement with the vertical groove portions 60 provided in the optical waveguide unit $W_2$ for fitting engagement with the substrate unit, so that the optical waveguide unit $W_2$ and the substrate unit $E_2$ are integrated together (with reference to FIGS. 1A and 1B). In this process, the side edges of the fitting plate portions 5a are positioned at the generally V-shaped corners of the vertical groove portions 60, and the lower edges of the fitting plate portions 5a are brought into abutment with the surface of the base 10. Thus, the substrate unit $E_2$, which is influenced by the generally V-shaped corners, is bowed in a direction such that the optical element 8 is moved toward the light-transmissive surface 2a of the core 2, and maintains such a bowed condition. It should be noted that parts of the vertical groove portions 60 and the fitting plate portions 5a which are in fitting engagement with each other may be fixed with an adhesive. In this manner, the intended optical sensor module is completed.

Figure 7A:
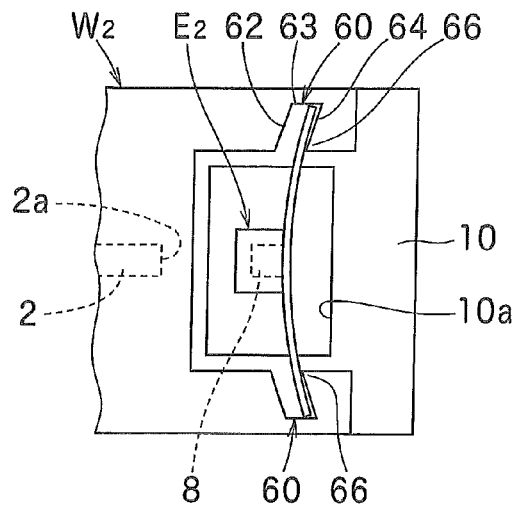
FIGS. 7A to 7C are plan views schematically showing principal parts of the optical sensor module according to other preferred embodiments of present invention.
Figure 7B:
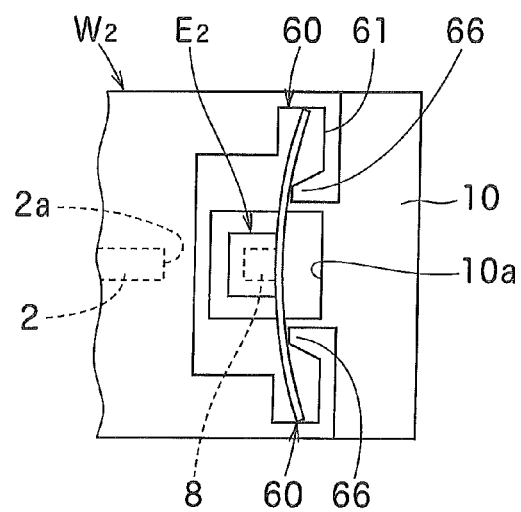
Figure 7C:
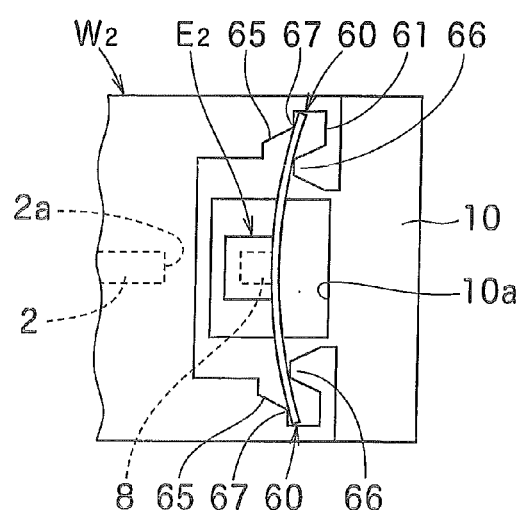

FIGS. 7A to 7C are plan views schematically showing principal parts of the optical sensor module according to other preferred embodiments of present invention. In these preferred embodiments, the vertical groove portions 60 in the optical waveguide unit $W_2$ have characteristic configurations. Specifically, parts of the vertical groove portions 60 in these preferred embodiments which are in a face-to-face relationship with a surface of the substrate unit $E_2$ opposite from the surface on which the optical element 8 is mounted are formed to serve as pressing portions 66 for pressing the opposite surface of the substrate unit $E_2$ toward the light-transmissive surface 2a of the core 2. The pressing portions 66 act to bow the substrate unit $E_2$ in a direction such that the optical element 8 is moved toward the light-transmissive surface 2a of the core 2.

Specifically, in the preferred embodiment shown in FIG. 7A, the side edges of the substrate unit $E_2$ are positioned respectively at inner wall surfaces 63 of the vertical groove portions 60 by the guiding action of the angled surfaces 62. The vertical groove portions 60 further include surfaces 64 in a face-to-face relationship with the angled surfaces 62, respectively. The surfaces 64 are in the form of angled surfaces parallel to the angled surfaces 62, and have distal ends formed to serve as the pressing portions 66, respectively, so that the substrate unit $E_2$ is bowed toward the core 2. In the preferred embodiment shown in FIG. 7B, parts of the vertical groove portions 60 which define the orthogonal surfaces 61, respectively, extend toward the center to form extrusions (the pressing portions 66) extruding toward the core 2. The extrusions act to bow the substrate unit $E_2$ toward the core 2. The preferred embodiment shown in FIG. 7C is a modification of the preferred embodiment shown in FIG. 7B. In the preferred embodiment shown in FIG. 7C, the guiding action of angled surfaces 65 is used, and the vertical groove portions 60 further include engaging portions 67, respectively, for engaging the opposite ends of the surface of the substrate unit $E_2$ on which the optical element 8 is mounted. The substrate unit $E_2$ is bowed more easily by the interaction between the engaging portions 67 and the pressing portions 66. Other parts of the preferred embodiments shown in FIGS. 7A to 7C are similar to those of the preferred embodiment shown in FIGS. 1A and 1B.

In the optical sensor module according to the above-mentioned preferred embodiments, the substrate unit $E_2$ is bowed in a direction such that the optical element 8 is moved toward the light-transmissive surface 2a of the core 2, as mentioned earlier. In FIGS. 1A and 1B, clearance is shown as created between the sealing resin 9 which seals the optical element 8 and an end surface of the over cladding layer 3 in front of the light-transmissive surface 2a of the core 2. However, the sealing resin 9 may be brought into intimate contact with the end surface of the over cladding layer 3 without the clearance. Such an arrangement is preferable from the viewpoint of the reduction in optical coupling loss. However, excessive adhesion at the intimate contact might result in damage.

In the above-mentioned preferred embodiments, the side edges of the fitting plate portions 5a are positioned respectively at the inner wall portions (the inner wall surfaces) of the vertical groove portions 60, with the optical waveguide unit $W_2$ and the substrate unit $E_2$ coupled together. However, when the substrate unit $E_2$ is allowed to be bowed toward the core 2 that is in alignment with the optical element 8, there is no need to position the side edges of the fitting plate portions 5a at the inner wall portions (the inner wall surfaces) of the vertical groove portions 60.

Figure 8:
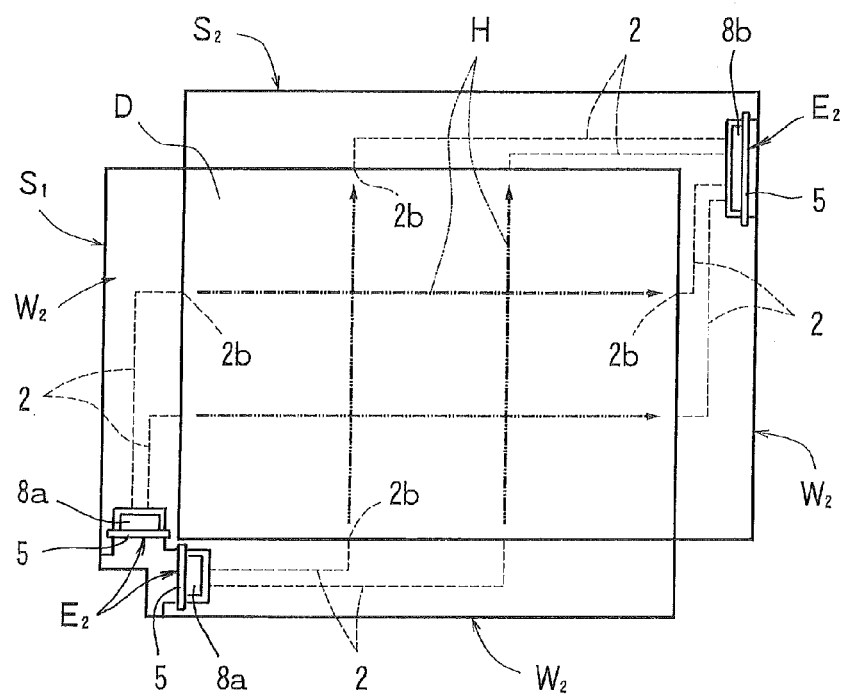
FIG. 8 is a plan view schematically showing a detection means for a touch panel using the optical sensor module.
Figure 9A:
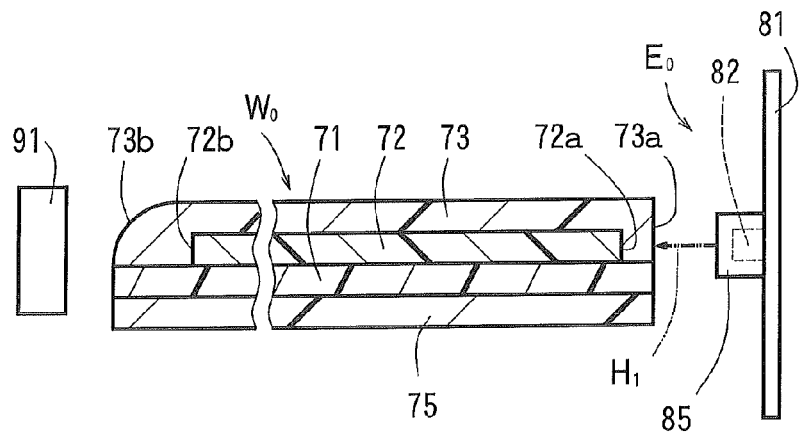
FIGS. 9A and 9B are views schematically illustrating a conventional method of alignment in an optical sensor module.
Figure 9B:
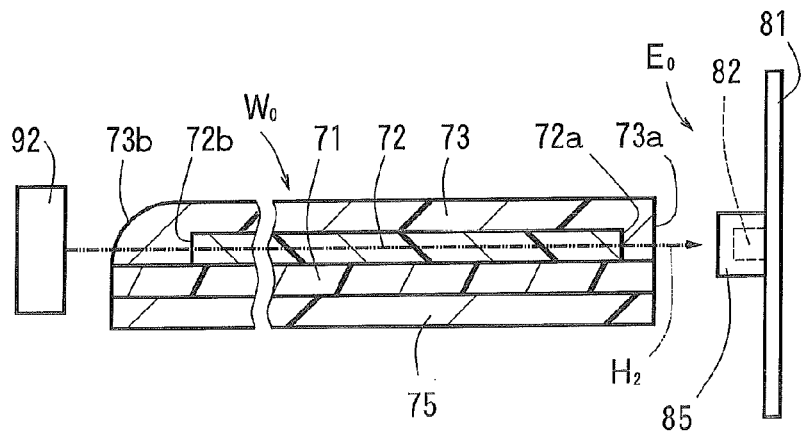

The optical sensor module according to the present invention may be used as a detection means for detecting a finger touch position and the like on a touch panel. This is done, for example, by forming two (first and second) L-shaped optical sensor modules $S_1$ and $S_2$ and using the two L-shaped optical sensor modules $S_1$ and $S_2$ opposed to each other to define a rectangular frame, as shown in FIG. 8. Specifically, the first L-shaped optical sensor module $S_1$ is configured such that two substrate units $E_2$ including respective light-emitting elements 8a mounted therein are in fitting engagement with a corner portion thereof, and such that end surfaces 2b of respective cores 2 and a lens surface of the over cladding layer 3 from which light beams H are emitted are disposed to face toward the inside of the rectangular frame. The second L-shaped optical sensor module $S_2$ is configured such that a single substrate unit $E_2$ including a light-receiving element 8b mounted therein is in fitting engagement with a corner portion thereof, and such that the lens surface of the over cladding layer 3 and the end surfaces 2b of respective cores 2 which receive the light beams H are disposed to face toward the inside of the rectangular frame. The two L-shaped optical sensor modules $S_1$ and $S_2$ are arranged along the rectangular periphery of a display screen of a rectangular display D of the touch panel so as to surround the display screen, so that the light beams H emitted from the first L-shaped optical sensor module $S_1$ are received by the second L-shaped optical sensor module $S_2$. This allows the emitted light beams H to travel in parallel with the display screen of the display D and in a lattice form on the display screen. When a portion of the display screen of the display D is touched with a finger, the finger blocks some of the emitted light beams H. Thus, the light-receiving element 8b senses a light blocked portion, whereby the position of the portion touched with the finger is detected. The substrate units $E_2$, which are shown in FIG. 8 as unbowed, are bowed in reality. In FIG. 8, the cores 2 are indicated by broken lines, and the thickness of the broken lines indicates the thickness of the cores 2. Also, the number of cores 2 is shown as abbreviated.

Next, an inventive example of the present invention will be described in conjunction with a conventional example. It should be noted that the present invention is not limited to the inventive example.

EXAMPLES

Material for Formation of Under Cladding Layer and Over Cladding Layer (Including Extensions)

A material for the formation of an under cladding layer and an over cladding layer was prepared by mixing 35 parts by weight of bisphenoxyethanolfluorene diglycidyl ether (component A), 40 parts by weight of 3',4'-epoxycyclohexyl-methyl 3,4-epoxycyclohexanecarboxylate (an alicyclic epoxy resin Celloxide 2021P available from Daicel Chemical Industries, Ltd.) (component B), 25 parts by weight of (3',4'-epoxycyclohexane)methyl-3',4'-epoxycyclohexyl carboxylate (Celloxide 2081 available from Daicel Chemical Industries, Ltd.) (component C), and two parts by weight of a 50% by weight propione carbonate solution of 4,4'-bis[di(β-hydroxyethoxy)phenylsulfinio]phenylsulfide bishexafluoroantimonate (component D).

Material for Formation of Core

A material for the formation of a core was prepared by dissolving 70 parts by weight of the aforementioned component A, 30 parts by weight of 1,3,3-tris{4-[2-(3-oxetanyl)]butoxyphenyl}butane, and one part by weight of the aforementioned component D in ethyl lactate.

Production of Optical Waveguide Unit

First, the material for the formation of the under cladding layer was applied to a surface of a stainless steel substrate with an applicator. Thereafter, the applied material was exposed to ultraviolet light irradiation (having a wavelength of 365 nm) at a dose of 2000 mJ/cm². Thus, the under cladding layer (having a thickness of 20 μm) was formed (with reference to FIG. 4A).

Then, the material for the formation of the core was applied to a surface of the under cladding layer with an applicator. Thereafter, a drying process was performed on the applied material at 100° C. for 15 minutes to form a photosensitive resin layer (with reference to FIG. 4B). Next, a synthetic quartz chrome mask (photomask) having an opening pattern identical in shape with the pattern of the core was placed over the photosensitive resin layer. Then, the photosensitive resin layer was exposed to ultraviolet light irradiation (having a wavelength of 365 nm) directed from over the mask at a dose of 4000 mJ/cm$^2$ by a proximity exposure method. Thereafter, a heating treatment was performed at 80° C. for 15 minutes. Next, development was performed using an aqueous solution of γ-butyrolactone to dissolve away unexposed portions of the photosensitive resin layer. Thereafter, a heating treatment was performed at 120° C. for 30 minutes. Thus, the core (having a thickness of 50 μm, and a width of 50 μm) was formed (with reference to FIG. 4C).

Next, a mold made of quartz (with reference to FIG. 5A) for the molding of the over cladding layer and vertical groove portions for fitting engagement with a substrate unit (the extensions of the over cladding layer) at the same time was set in an appropriate position with respect to a light-transmissive surface of the core (with reference to FIG. 5B). Then, the material for the formation of the over cladding layer and the extensions thereof was injected into a mold space defined in the mold, and thereafter exposed to ultraviolet light irradiation at a dose of 2000 mJ/cm$^2$ through the mold. Subsequently, a heating treatment was performed at 120° C. for 15 minutes. Thereafter, the mold was removed. Thus, the over cladding layer and the vertical groove portions for fitting engagement with the substrate unit were provided (with reference to FIG. 5C). The thickness of the over cladding layer (as measured from the surface of the under cladding layer) was 1000 μm when measured with a contact-type film thickness meter.

Then, the stainless steel substrate was stripped from the back surface of the under cladding layer (with reference to FIG. 5D). At this time, a portion of the under cladding layer where the over cladding layer was absent, which was included in portions of the under cladding layer corresponding to the vertical groove portions of the over cladding layer, was stripped off (together with the stainless steel substrate) while adhering to the stainless steel substrate. As a result, the vertical groove portions were formed to extend across the thickness of the under cladding layer and the over cladding layer. Then, a resultant optical waveguide unit thus stripped was bonded onto an acrylic board with an adhesive therebetween (with reference to FIGS. 2A and 2B). The configuration of the vertical groove portions was that shown in FIG. 7C. A distance between opposed inner wall surfaces of the vertical groove portions was 14.00 mm.

Production of Substrate Unit

An insulation layer (having a thickness of 10 μm) made of a photosensitive polyimide resin was formed on a portion of a surface of a stainless steel substrate (25 mm×30 mm×50 μm (thick)) (with reference to FIG. 6A). Then, a semi-additive process was performed to form a laminate comprised of a seed layer made of copper/nickel/chromium alloy, and an electro copper plated layer (having a thickness of 10 μm) on a surface of the insulation layer. Further, a gold/nickel plating process (gold with a thickness of 0.2 μm, and nickel with a thickness of 2.0 μm) was performed on a surface of the laminate to form an optical element mounting pad (including an electric circuit) including the laminate and a gold/nickel plated layer (with reference to FIG. 6B).

Next, etching was performed using a dry film resist so that fitting plate portions were formed in an appropriate position relative to the optical element mounting pad, whereby the stainless steel substrate was formed into a shaped substrate having the fitting plate portions. Thereafter, the dry film resist was stripped away using an aqueous sodium hydroxide solution (with reference to FIG. 6C).

A silver paste was applied to a surface of the optical element mounting pad. Thereafter, a high-precision die bonder (mounting apparatus) was used to mount a light-emitting element of a wire bonding type (SM85-1N001 available from Optowell Co., Ltd.) onto the silver paste. Then, a curing process was performed to harden or cure the silver paste. Thereafter, the light-emitting element and its surrounding portion were sealed with a transparent resin (NT-8038 available from Nitto Denko Corporation) by potting (with reference to FIG. 6D). In this manner, a substrate unit was produced. The fitting plate portions of the substrate unit had a vertical dimension of 2.0 mm, and a horizontal dimension (a protrusion length) of 2.0 mm; and the substrate unit had an overall width of 14.05 mm.

Manufacture of Optical Sensor Module

The fitting plate portions provided in the substrate unit were brought into fitting engagement with the respective vertical groove portions provided in the optical waveguide unit for fitting engagement with the substrate unit, and the lower edges of the fitting plate portions were brought into abutment with a surface of the acrylic board. This caused the substrate unit to be bowed in a direction such that the light-emitting element was moved toward the light-transmissive surface of the core. Thereafter, parts of the vertical groove portions and the fitting plate portions which were in fitting engagement with each other were fixed with an adhesive. In this manner, an optical sensor module was manufactured (with reference to FIGS. 1A and 1B).

Conventional Example

An optical sensor module in this conventional example was similar to that in the inventive example except that the vertical groove portions for fitting engagement with the substrate unit were of a generally U-shaped cross-sectional configuration (having a flat inner wall surface, and opposite side wall surfaces orthogonal to the inner wall surface) shown in FIGS. 10A and 10B. In the optical sensor module in the conventional example, the substrate unit was bowed in a direction such that the light-emitting element was moved away from the light-transmissive surface of the core.

Optical Coupling Loss

Five optical sensor modules (the number of samples N=5) were prepared in each of the inventive example and the conventional example. Then, current was fed through the light-emitting element of each of the optical sensor modules to cause the light-emitting element to emit light. Then, the intensity of the light emitted from a distal end portion of each of the optical sensor modules was measured, and an optical coupling loss was calculated. Also, an average optical coupling loss was calculated. The results of the calculation were listed in Table 1 below.

TABLE 1

|  | Inventive Example | Conventional Example |
|---|---|---|
| Optical Coupling Loss (dB) (N = 5) | 19.52 | 22.02 |
|  | 20.67 | 21.04 |
|  | 18.72 | 21.71 |
|  | 19.04 | 21.62 |
|  | 20.15 | 21.53 |
| Average (dB) | 19.62 | 21.59 |

The average optical coupling losses in Table 1 show that the optical coupling losses are reduced in the inventive example, as compared with those in the conventional example.

In the inventive example, the vertical groove portions in the optical waveguide unit had the configuration shown in FIG. 7C. However, results similar to those in the inventive example were produced when the vertical groove portions shown in FIGS. 1A, 7A and 7B were used.

The optical sensor module according to the present invention may be used for detection means for detecting a finger touch position and the like on a touch panel, or for information communications equipment and signal processors for transmitting and processing digital signals representing sound, images and the like at high speeds.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. An optical sensor module, comprising:
   an optical waveguide unit; and
   a substrate unit, the optical waveguide unit and the substrate unit being coupled to each other,
   wherein the optical waveguide unit includes
      an under cladding layer,
      a linear core for an optical path provided on a surface of the under cladding layer,
      an over cladding layer covering the core, and
      a pair of left-hand and right-hand fitting portions for fitting engagement with the substrate unit, the fitting portions being provided in part of the over cladding layer lying in an appropriate position relative to a light-transmissive surface of the core,
   wherein the substrate unit includes
      a substrate,
      an optical element mounted on a predetermined portion of the substrate, and
      to-be-fitted portions for fitting engagement with the fitting portions of the optical waveguide unit, the to-be-fitted portions being provided in part of the substrate lying in an appropriate position relative to the optical element, and
   wherein the coupling between the optical waveguide unit and the substrate unit are provided in conditions where the to-be-fitted portions provided in the substrate unit are in fitting engagement with the fitting portions provided in the optical waveguide unit and where the substrate unit is bowed in a direction such that the optical element is moved toward the light-transmissive surface of the core.

2. The optical sensor module according to claim 1, wherein the left-hand and right-hand fitting portions provided in the optical waveguide unit are vertical groove portions of a generally V-shaped cross-sectional configuration extending across the thickness of the optical waveguide unit, the vertical groove portions having generally V-shaped respective openings opposed to each other, each of the vertical groove portions having a first wall surface and a second wall surface which constitute generally V-shaped wall surfaces, the first wall surface being in a face-to-face relationship with a surface of the substrate unit opposite from the surface on which the optical element is mounted, the first wall surface being a surface orthogonal to a longitudinal direction of the core, the second wall surface being a surface angled with respect to the longitudinal direction of the core, the to-be-fitted portions in the substrate unit including side edges positioned respectively at generally V-shaped corners of the vertical groove portions.

3. The optical sensor module according to claim 2, wherein the to-be-fitted portions in the substrate unit are made of metal.

4. The optical sensor module according to claim 3, wherein the metal serving as the material for the formation of the to-be-fitted portions is stainless steel.

5. The optical sensor module according to claim 1, wherein the left-hand and right-hand fitting portions provided in the optical waveguide unit are vertical groove portions extending across the thickness of the optical waveguide unit, the vertical groove portions having respective openings opposed to each other, part of each of the vertical groove portions in a face-to-face relationship with a surface of the substrate unit opposite from the surface on which the optical element is mounted being provided to serve as a pressing portion for pressing the opposite surface of the substrate unit toward the light-transmissive surface of the core, the to-be-fitted portions in the substrate unit including side edges positioned respectively at inner wall surfaces of the vertical groove portions.

6. The optical sensor module according to claim 5, wherein the to-be-fitted portions in the substrate unit are made of metal.

7. The optical sensor module according to claim 6, wherein the metal serving as the material for the formation of the to-be-fitted portions is stainless steel.

8. The optical sensor module according to claim 1, wherein the to-be-fitted portions in the substrate unit are made of metal.

9. The optical sensor module according to claim 8, wherein the metal serving as the material for the formation of the to-be-fitted portions is stainless steel.

* * * * *